United States Patent [19]

Tsui et al.

[11] Patent Number: 4,770,570
[45] Date of Patent: Sep. 13, 1988

[54] GUN DRILL COOLANT BUSHING

[75] Inventors: Gary Tsui, Rosemead; Thomas Heimbigner, Bellflower, both of Calif.

[73] Assignee: CBC Industries, Inc., Los Angeles, Calif.

[21] Appl. No.: 895,477

[22] Filed: Aug. 11, 1986

Related U.S. Application Data

[63] Continuation-in-part of Ser. No. 725,102, Apr. 19, 1985, abandoned.

[51] Int. Cl.4 .............................................. B23B 51/06
[52] U.S. Cl. ..................................... 408/61; 408/72 B; 408/241 B; 408/115 B
[58] Field of Search .................... 408/56, 57, 61, 72 R, 408/72 B, 115 R, 115 B, 241 B, 241 R; 279/20; 175/214, 207, 208

[56] References Cited

U.S. PATENT DOCUMENTS

| | | | |
|---|---|---|---|
| 819,756 | 5/1906 | Hellman et al. | 175/708 |
| 1,611,028 | 12/1926 | Harrison | 175/208 |
| 2,409,525 | 10/1946 | Andreasson | 408/59 |
| 2,510,203 | 6/1950 | Andreasson | 408/72 |
| 2,690,149 | 9/1954 | Adams | 408/57 |
| 3,874,808 | 4/1975 | Zaccordelli et al. | 408/56 |

FOREIGN PATENT DOCUMENTS

| | | | |
|---|---|---|---|
| 2838434 | 3/1979 | Fed. Rep. of Germany | 408/56 |
| 1426004 | 12/1960 | France | 175/214 |
| 511785 | 1/1955 | Italy | 408/56 |
| 2084057 | 4/1982 | United Kingdom | 408/56 |

Primary Examiner—Z. R. Bilinsky
Attorney, Agent, or Firm—Beehler, Pavitt, Siegemund, Jagger, Martella & Dawes

[57] ABSTRACT

A lock collar for a drill bushing and a system for cooling a drill bit during a drilling operation are arranged so as to be incorporated into a single mechanism. The mechanism involves two assemblies, one being a locking liner embedded in a jig plate, and the other being a coolant directing assembly adapted to be mounted on a power-fed tool. There is coolant passage means in the coolant directing assembly which accepts coolant from an appropriate source and directs it through the first mentioned assembly to the cutting edge of the drill bit or other cutting tool while the cutting operation is taking place. By reverse rotation of the coolant directing assembly, that assembly can then be removed for subsequent engagement with another locking liner.

13 Claims, 4 Drawing Sheets

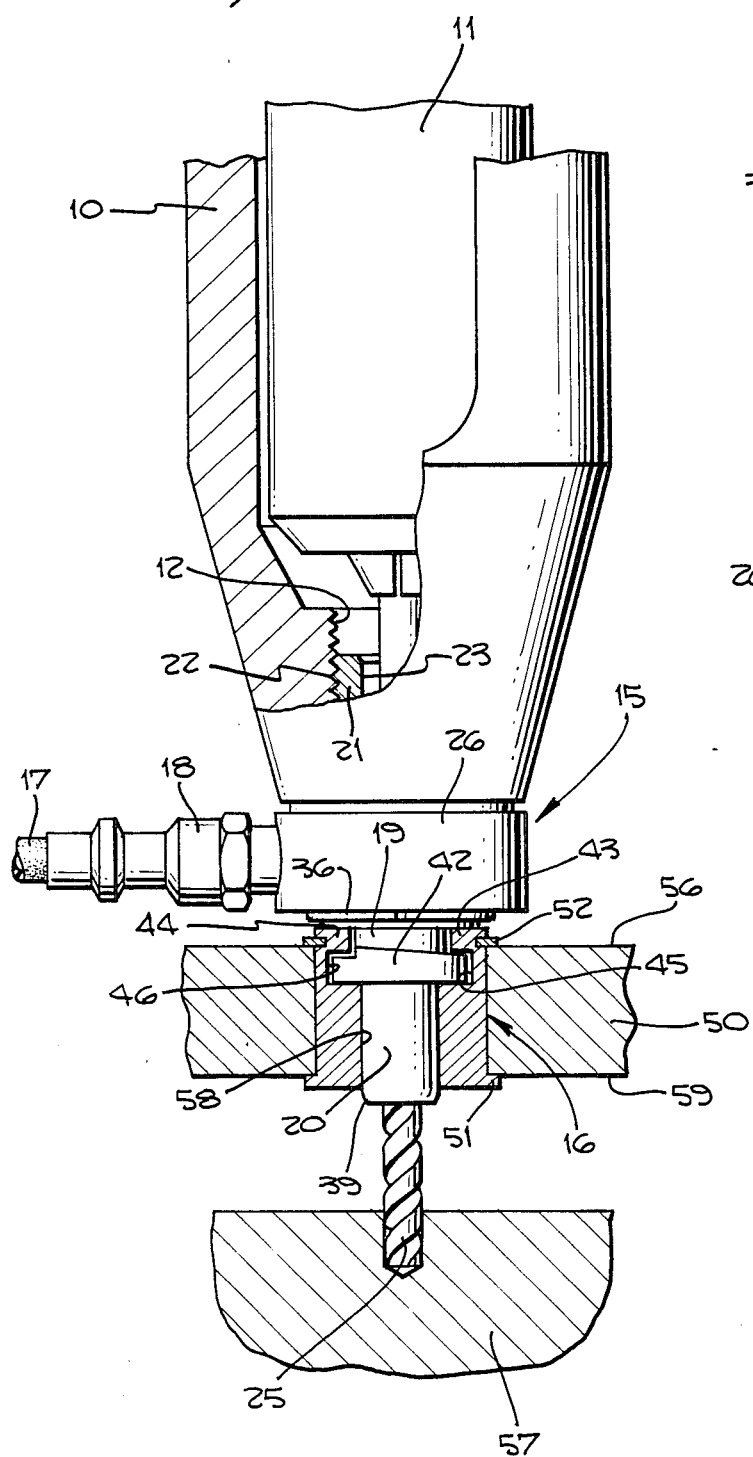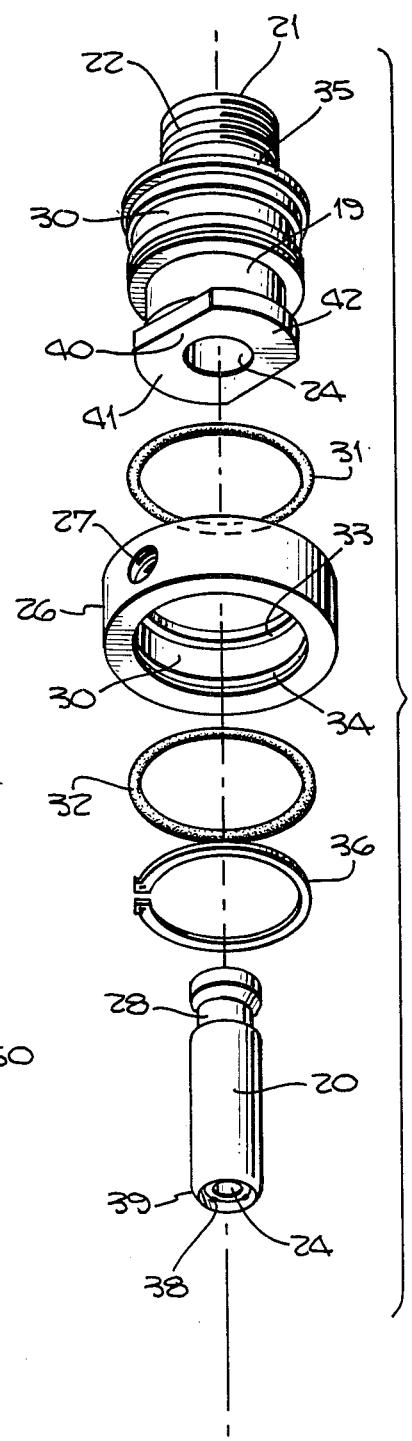

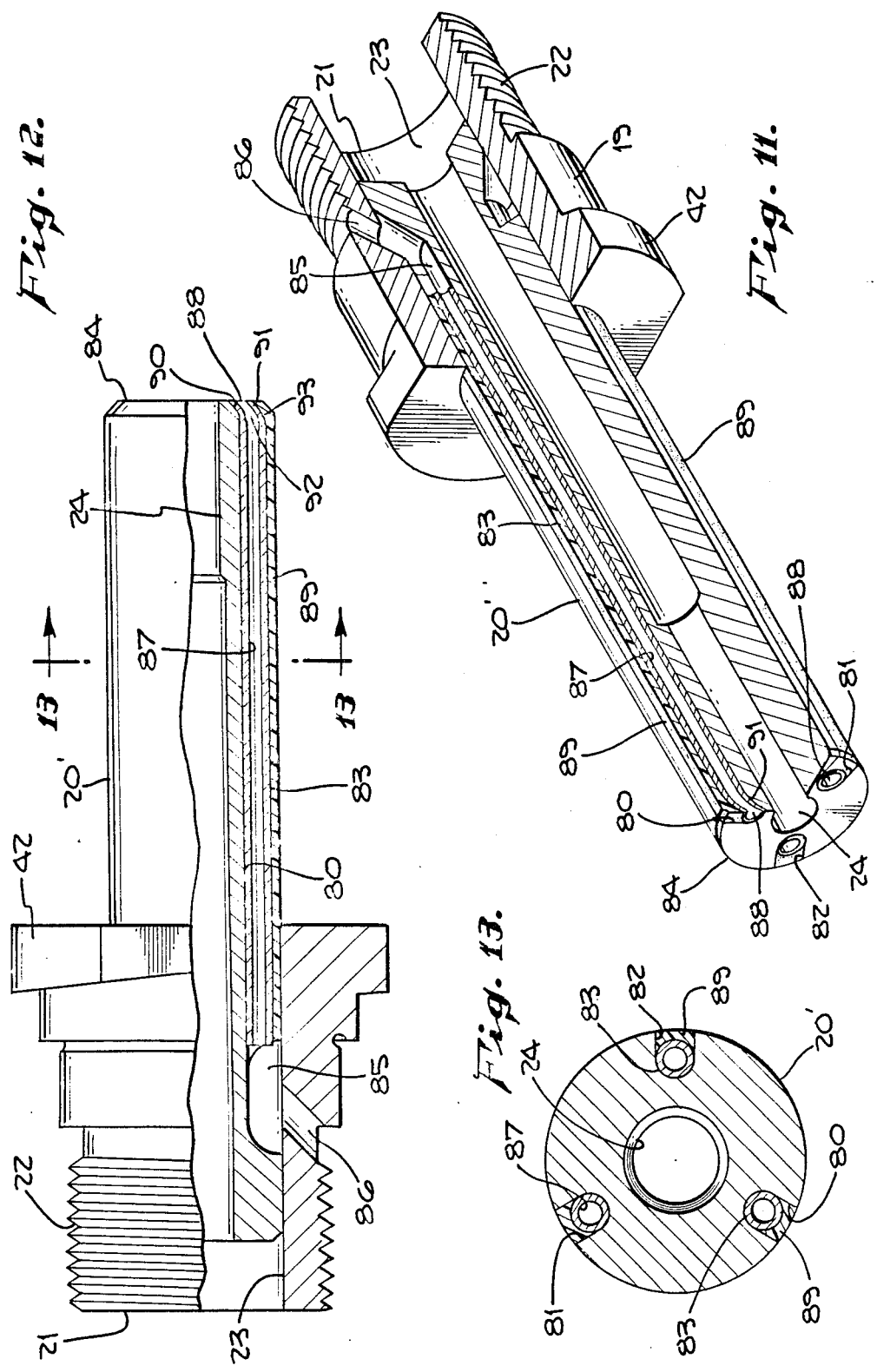

4,770,570

GUN DRILL COOLANT BUSHING

This is a continuation-in-part of co-pending application Ser. No. 725,102 filed Apr. 19, 1985 now abandoned.

BACKGROUND OF THE INVENTION

The invention here involved has reference to a drill bushing of the type where one part is stationarily mounted as on a drill jig, and the other part portably mounted upon the power tool, the portable part being provided with coolant passages to direct a coolant liquid from an appropriate source to the tool where the cutting edge of the tool is in engagement with the work piece. There is a special arrangement of coolant passages in the portable part attached to the power tool which is such that the coolant passes entirely within the stationary part without the need for any portion of the coolant passages to be in the stationary part. The movable part is of such character that it can be reversed into disengagement from the stationary part, and thereafter immediately directly driven into engagement with a succeeding stationary part at a different location.

Drill bushings have been widely used in various applications to radially and axially guide drills and reamers. Various existing bushing designs have been proposed to improve cutting efficiency. In the metal working industries, applying coolant to the cutting tool in a proper place has become critical in most drilling and reaming operations. Accordingly, addition of a coolant port on the portable part of the device should be one to allow passage of liquid coolant directly through appropriate orifices of the bushing shank directly to the cutting edge of the tool. It is also important to have the functioning parts quickly engageable and re-engageable so that the operation can be shifted from one location to another without delay in the manufacturing process.

It is therefore among the objects of the invention to provide a new and improved coolant device for portable power feed drills which provides an appropriate continuous flow of coolant directly to the cutting edge of the tool.

Another object of the invention is to provide a new and improved coolant device for drill bushings of a character such that the coolant is fed constantly to the work piece, whereby to serve also as a lubricating fluid to help dissipate friction heat and to extend tool life.

Further among the objects of the invention is to provide a new and improved coolant device for portable power-fed cutting tools comprising cooperating parts one of which being a relatively simple structure can be jig mounted in multiple numbers in stationary position and the others of which, being a portable structure, can be mounted on the powerful tool and readily shifted from one stationary structure to another.

Still another object of this invention is to provide a new and improved coolant device comprising cooperating parts wherein one of such parts is a relatively simple jig mounted structure and the other is a portable structure carrying all of the lubricant passages in an arrangement wherein the portable structure passes coolant through the stationary structure directly to the cutting edge of the tool, the direction of flow being a function of the portable structure.

Also included among the objects of the invention is to provide a new and improved coolant device of portable character wherein the attachment to the coolant supply line provides a 360 degree swivel so that the tool and associated parts can be oriented in any direction with respect to the work.

Included further among the objects of the invention is to provide a new and improved efficient and dependable portable coolant device capable of directing a continuous flow of coolant to the cutting edge sufficiently well directed so that the force of the coolant flow is capable of forcing chips away from the work piece.

The objects include also such a coolant device capable of constant feed of coolant to the cutting edge in order to dissipate heat and accordingly extend the tool life, the coolant being made to serve as a lubricant whereby galling is reduced, as is also the dulling effect on the cutting edge of the tool, the result of which is an increase in surface finish and reduction in rejection rates in addition to adding to tool life.

With these and other objects in view, the invention consists of the construction, arrangement, and combination of the various parts of the device serving as an example only of one embodiment of the invention, whereby the objects contemplated are attained, as hereinafter disclosed in the specification and drawings, and pointed out in the appended claims.

FIG. 1 is a side elevational view of the device with parts partially in section shown assembled and in a position guiding a drill bit into engagement with a work piece.

FIG. 5 is an exploded view of parts of the portable portion of the device.

FIG. 11 is a side perspective view of a modified form of the device partially broken away to show interior construction.

FIG. 12 is a side elevational view of the form of FIG. 11 partially broken away.

FIG. 13 is a cross-sectional view taken on the line 13—13 of FIG. 12.

Figure 2:
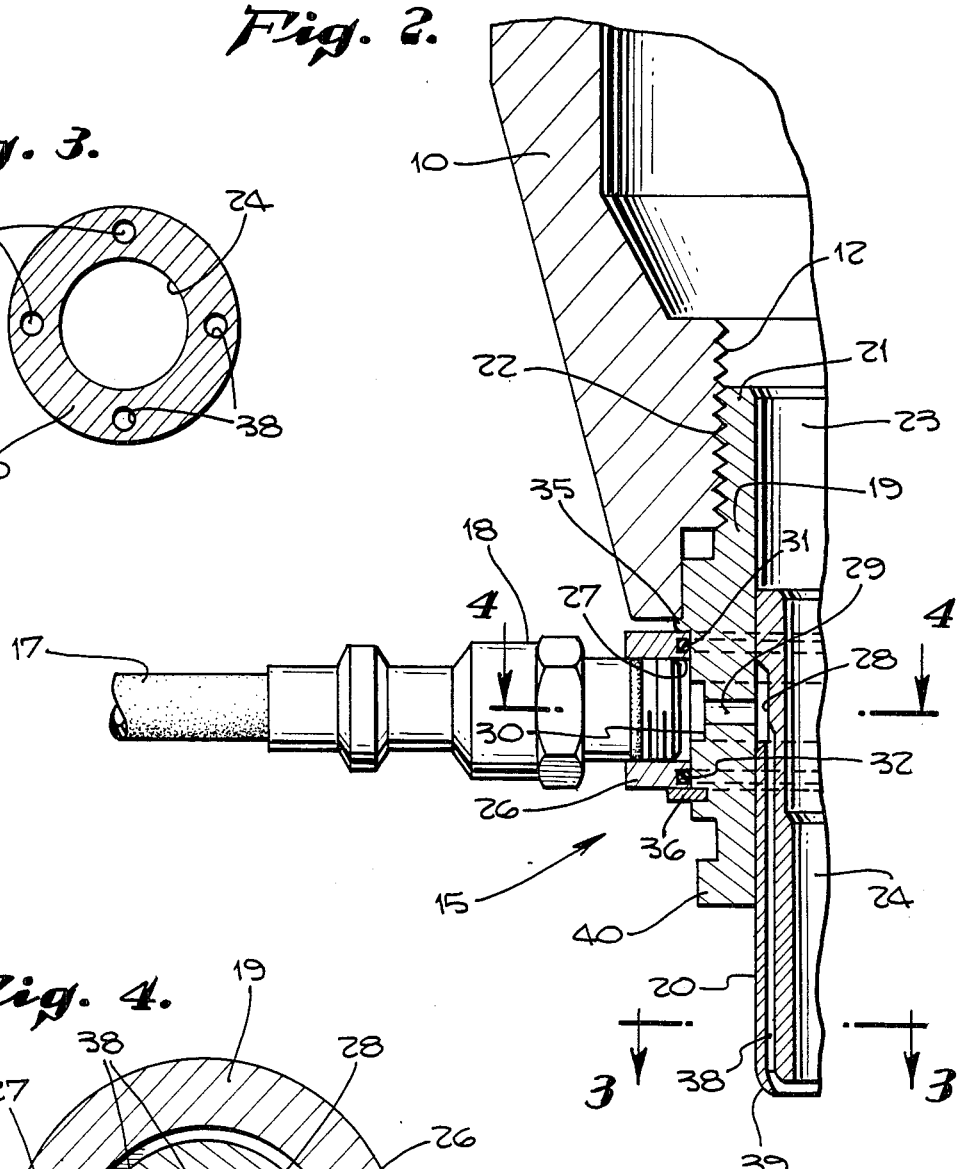
FIG. 2 is a fragmentary longitudinal sectional view taken through the portable assembly portion of the device.
Figure 3:
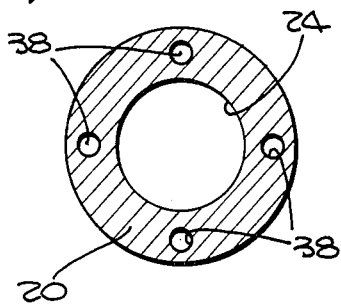
FIG. 3 is a cross-sectional view on the line 3—3 of FIG. 2.
Figure 4:
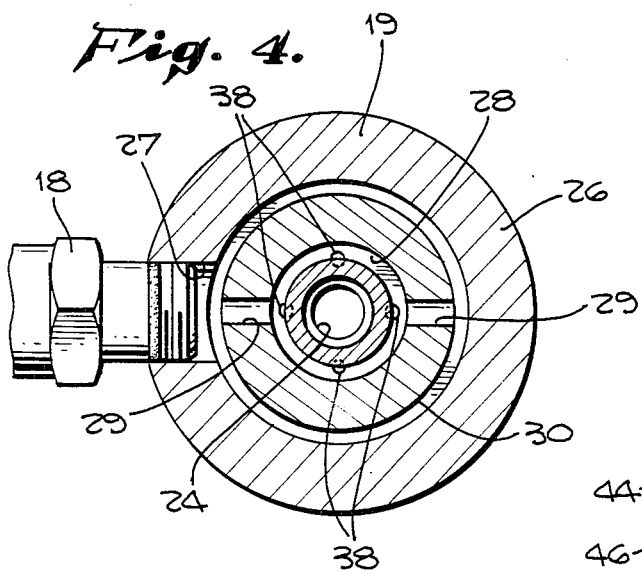
FIG. 4 is a cross-sectional view on the line 4—4 of FIG. 2.

In one embodiment of the invention chosen for the purpose of illustration, there is shown a case 10 of a conventional power actuated tool in which is located for rotation a conventional three-jaw chuck 11. At the lower end of the case is an interiorly threaded opening 12 adapted for engagement with the coolant handling device comprising the invention.

There are two significant parts for the coolant handling device, one being a portable coolant directing assembly indicated for convenience by the reference character 15. The second part is a stationary subassembly indicated for convenience by the reference character 16. The exploded view of FIG. 6 pictures elements comprising the coolant directing assembly 15. A flexible supply line 17 brings liquid coolant to a conventional fitting 18, one element of which engages the coolant directing assembly 15 so as to feed liquid coolant to the assembly.

The coolant directing assembly 15 includes a body 19 in which is mounted a bushing shank 20. An upper extension 21 of the body is provided with an exterior thread 22 for engagement with the interior threaded opening 12 of the case 10, whereby to mount the coolant directing assembly 15 on the power tool. By virtue of this feature the coolant directing assembly 15 becomes in effect temporarily a part of the portable power tool.

A tool passage 23 in the body 19 leads directly into a counter bore 24, the counter bore 24 being for accommodation of a cutting tool such as the drill bit 25.

Extending around the body 19 is a coolant sleeve 26 which is actually that part of the coolant directing assembly 15 to which the fitting 18 is attached for introduction of the coolant. An entry port 27 in the coolant sleeve accommodates the fitting 18. A coolant distributing groove 28 on the exterior of the shank 20 accepts coolant from the two coolant holes 29 in turn fed from the annular recess 30 on the interior of the coolant sleeve 26.

For sealing the sleeve there are provided O-rings 31 and 32 which fit in appropriate O-ring grooves 33 and 34. The coolant sleeve 26 is held in place against a collar 35 by employment of a snap ring 36 in its groove on the exterior of the body 19.

Coolant is conducted from the coolant distributing groove 28 through a series of coolant bores 38, which in the chosen embodiment number two. It is of consequence to note that there is provided a rolled tip 39 at the outer end of the shank 20 for the purpose of deflecting coolant angularly inwardly toward the counter bore 24, and consequently the drill bit 25 and its cutting edge as coolant emerges from the coolant bores 38.

At the end of the body 19 is a flange 40 having opposite projections 41 and 42, the projections on their inner faces being milled at a helix angle for ultimate coupling to the stationary subassembly 16.

To accept the projections 41 and 42 the stationary subassembly is provided with oppositely located locking flanges 43 and 44, the locking flanges being provided respectively with slot 45 and 46 for reception respectively of the locking flanges 43 and 44. Cutouts 48 and 49 in the stationary subassembly provide spaces between the locking flanges 43 and 44 for reception of the projections 41 and 42 of the body 19. Engagement of the portable assembly exemplified by the body 19 and bushing shank 20, with the stationary jig plate 63 is facilitated by flexibility of the supply line 17 and need for rotation of the body no more than about a half circle to accomplish the temporary interlock. In other words, the jig plate is fixed in position but the coolant assembly is not.

Figure 6:
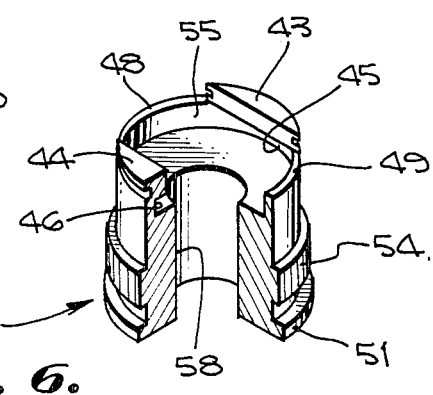
FIG. 6 is a perspective view partially cut away of the stationary portion of the device.
Figure 7:
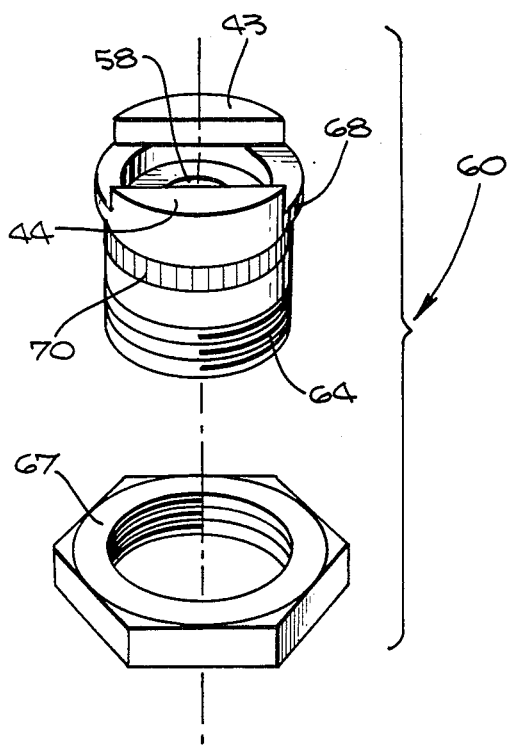
FIG. 7 is an exploded perspective view of a second form of stationary subassembly.
Figure 8:
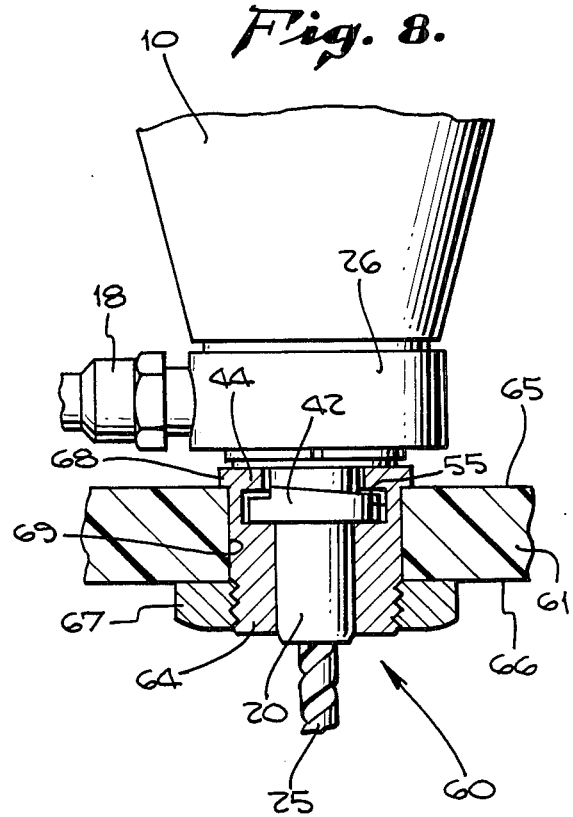
FIG. 8 is a vertical sectional view of the subassembly of FIG. 7, mounted in a jig plate.
Figure 10:
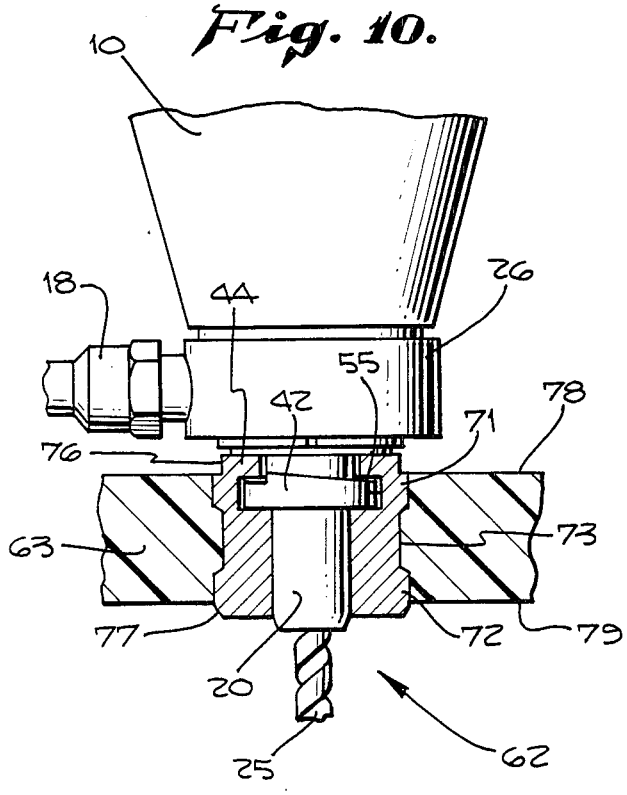
FIG. 10 is a vertical sectional view of the subassembly of FIG. 9 mounted in a molded jig plate.
Figure 9:
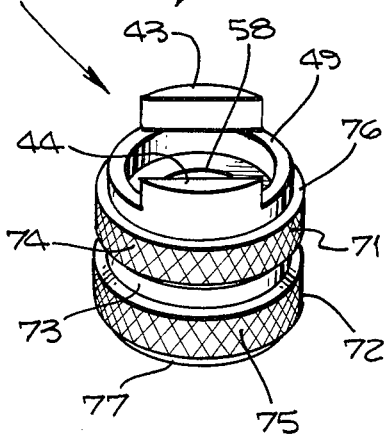
FIG. 9 is a perspective view of still another form of stationary subassembly.

In actual practice there would in all probability be a multiple number of stationary subassemblies 16 used in a single jig plate 50. One form of these is shown in FIGS. 1 and 6 of the drawings. As shown, the stationary subassembly 16 is mounted in the jig plate 50, the jig plate being confined between a ferrule 51 on the body of the stationary subassembly and a snap ring 52 on the opposite side. Various conventional jig plates are available into which the stationary subassembly may be inserted as, for example, by a press fit assisted by the knurling 54. If the jig plate should chance to be of plastic, such as a plastic sheet, the stationary subassembly could be molded in its appropriate position.

It is of further consequence to note that an annular recess 55 in the stationary subassembly is at a location inwardly of a face 56 of the jig plate 50, so that when the coolant directing assembly is in engagement with the stationary subassembly, as shown in FIG. 1, the space between the jig plate and the coolant directing assembly is as small as is structurally practical.

When a drilling or other cutting operation is to be performed, coolant flow is initiated in the supply line 17 and the coolant directing assembly 15 moved downwardly so that the projections 41 and 42 are extended into the cutouts 48 and 49. When rotating power is applied to the chuck 11, the projections 41 and 42 engage the slots 45 and 46 in a manner such that the presence of the milled helix angle on the projections pulls the coolant directing assembly into snug engagement with the stationary subassembly as the drilling operation starts driving the drill bit into a work piece 57. The bushing shank 20 is rotatably disposed in a guide bore 58 in the stationary sub-assembly.

As long as the cutting operation continues with the work piece 57, coolant from the coolant bores 38 will be directed by the help of the roller tip 39 angularly inwardly toward the axis of rotation of the tool 25, and, in particular, at the cutting edge so that the coolant not only cools the operation, serves as a lubricant for the cutting, but also serves to flush out the chips as they are cut from the work piece.

After the cutting operation on the work piece has been completed by reverse motion of the chuck 11, the projections 41 and 42 are disengaged from the slots 45 and 46. Thereafter the coolant directing assembly can be withdrawn from the stationary subassembly and then moved to another similar stationary subassembly at another location on the jig plate. If need be, coolant flow may be cut off during the transfer.

The stationary subassemblies may on occasions be varied to a degree as note subassembly 60 which is screw mounted in a jig plate and of fixed thickness and subassembly 62 which is adjusted to be molded in position in a plastic figure plate 63.

For the subassembly 60 there is an exteriorly threaded portion 64 of sufficient length to extend through the jig plate 61 of predetermined thickness from a face 65 adjacent the chuck to an outer face 66. A relative flat nut 67 engages the exteriorly threaded portion 64 and upon being drawn against the outer face 66 draws a flange 68 against the face 65, in that way to firmly anchor the subassembly 60 in position in the jig plate 61. While the exteriorly threaded portion is being drawn in a hole 69 in the jig 61 an annular serrated section 70 of the subassembly 60 is forced into engagement with the wall of the hole 69 is resist tendency of the subassembly 60 to rotate during operation.

For the subassembly 62 there is a somewhat varied exterior configuration in order for it to be securely contained in the plastic jig 63 by a molding procedure. An acceptable configuration is like that shown where inner and outer annular bands 71 and 72 respectively lie on opposite sides of an annular recess 73. The bands 71 and 72 preferably have roughened exterior surfaces 74 and 75 for being more securely embedded in the soft tooling of the molded plastic jig plate 63 thereby to resist rotation of the subassembly during operation.

Preferably, also outer edges of the bands 71 and 72 terminate in respective annular edges 76 and 77. In that way, the subassembly 62 presents a low profile in that neither end protrudes measurably beyond the respective surfaces 78 and 79 of the jig plate. The desired low profile mounting is also a feature of the subassembly 16 of the first described form of the invention. A comparable low profile is maintained for the subassembly 60, especially adjacent the face 65 of the jig plate. By keeping the exterior threaded portion 64 short for reception of the flat nut 67 the low profile is maintained adjacent the face 66.

In the form of invention of FIGS. 11, 12 and 13 there are three specially formed circumferentially spaced elongated coolant recesses 80, 81 and 82 in the bushing shank 20. Each of the coolant recesses is preferably cut through the cylindrical exterior surface of the bushing shank, radially inwardly to a depth in excess of the diameter of a tube 83. Each tube extends from a free end 84 of the bushing shank into engagement with an annular coolant distribution recess 85 adjacent to the opposite end. An obliquely disposed coolant inflow passage 86 supplies the distribution recess 85 from a location where it can be reached by coolant from the supply line 17, similar to the disclosure in the first form of the invention.

By making use of milled of coolant recesses 80, 81 and 82 manufacturing problems may be minimized as might be experienced for example by the operation called for in the first form of the invention where coolant bores 38 are drilled. The tubes 83, one of which is used in each of the recesses, provide coolant passageways 87 from the distribution recesses 85 to an outlet end 88. The tubes 83, designated micro tubes for some installations may be copper, aluminum, metal compositions of other conventional natures or of an appropriate synthetic plastic resin material. The essence of the improvement is in the provision of a preformed tube to be embedded in the recess. To anchor the tubes 83 in the corresponding recess resort may be had to an appropriate synthetic plastic resin material 89 in which the tube is embedded, after which the plastic material hardens. Other appropriate conventional embedding compounds may also be used. One found especially acceptable is that of a mixture of 50% epoxy resin and 50% powdered metal such as powdered steel. Whichever may be chosen it should be capable of being finally trimmed down to level coincident with the exterior surface of the bushing shank 20.

In order to direct coolant outflow obliquely inward toward the axis of the counter bore 24 the innermost corner 90 of the recess may be beveled to make possible bending the corresponding end 91 of the tube obliquely inwardly. The direction of the bend may be varied depending on the coolant flow desired. It may also be desirable to reduce the inside diameter 92 of the tube at the outflow end to provide in effect, a nozzle 93.

While particular embodiments of the present invention have been shown and described, it will be obvious to those skilled in the art that changes and modifications may be made without departing from the invention in its broader aspects, and therefore, the aim of the appended claims is to cover all such changes and modifications as fall within the true spirit and scope of the invention.

Having described the invention, what is claimed as new in support of Letters Patent is as follows:

1. A coolant handling device for a drill bushing for directing flow of a coolant toward the cutting edge of a rotating cutting tool, said device being in the nature of a portable coolant directing assembly comprising a portable body having releasable and reusable attachments means for engagement and rotation with a rotatable portion of a conventional portable power tool, a cylindrical bushing having a shank extending from said body, a sleeve means extending around and in rotatable engagement with said body, said shank having a counter bore for reception of a separately acting cutting tool, said shank having a free end adapted to extend outwardly of said body and a captive end within and in engagement with said body, said shank and said body having a rotatable engagement with said sleeve means, coolant directing passage means extending between the captive end of said shank and an outlet at the free end of said shank, said passage means extending obliquely inwardly toward the long axis of said counter bore for directing coolant toward the axis of said counter bore, an exterior coolant inlet in the sleeve, and interconnecting passage means in the sleeve and body extending between the exterior coolant inlet and the coolant directing passage means of said shank.

2. A coolant handling device as in claim 1 wherein said shank has radially inwardly directed coolant deflecting means at the free end of said shank in position adapted to deflect coolant toward the axis of said counter bore and any tool extending through said counter bore.

3. A coolant handling device as in claim 1 wherein said coolant directing assembly includes a tool passage through said body, said bushing shank having its captive end mounted in said tool passage, the attachment means on the body for mounting said coolant directing assembly on an appropriate power tool being a screw threaded attachment means.

4. A coolant handling device for a portable electric drill for directing flow of a coolant toward the cutting edge of a rotating cutting tool, said device including a coolant directing assembly comprising a portable body and a cylindrical drill bushing having an shank extending from said body, said shank having a counter bore for reception of a cutting tool, said shank having a free end adapted to extend outwardly of said body and a captive conventional portable power tool, a cylindrical bushing having a shank extending from said body, a sleeve means extending around and in rotatable engagement with said body, said shank having a counter bore for reception of a separately acting cutting tool, said shank having a free end adapted to extend outwardly of said body and a captive end within and in engagement with said body, said shank and said body having a rotatable engagement with said sleeve means, coolant directing passage means extending between the captive end of said shank and an outlet at the free end of said shank, said passage means extending obliquely inwardly toward the long axis of said counter bore for directing coolant toward the axis of said counter bore, an exterior coolant inlet in the sleeve, and interconnecting passage means in the sleeve and body extending between the exterior coolant inlet and the coolant directing passage means of said shank.

5. A coolant handling device as in claim 4 wherein said coolant sleeve is rotatable throughout 360 degrees of rotation and there is a fitting on the coolant sleeve for attachment thereto of a flexible supply line for coolant.

6. A coolant handling device as in claim 4 wherein said coolant sleeve is rotatable throughout 360 degrees of rotation and there is a fitting on the coolant sleeve for attachment thereto of a flexible supply line for coolant, and means forming an annular recess between said coolant inlet port and the adjacent end of said coolant directing passage means.

7. A coolant handling device as in claim 6 wherein said coolant directing passage means comprises a plurality of coolant bores in said shank at a location between said counter bore and the exterior of said shank, said coolant bores having inlet ends at the captive end of the shank and outlet ends at the extremity of the free end of said shank.

8. A coolant handling device for a drill bushing adapted to direct flow of a coolant to the cutting edge of a rotating cutting tool, said device comprising a stationary subassembly in cooperation with a portable coolant directing assembly, rotationally engageable and releasable interlocking members respectively on said stationary subassembly and said coolant directing assembly, a shank extending from said coolant directing assembly and having a counter bore for reception of a cutting tool, said stationary subassembly having a guide bore therethrough for reception of said shank, said shank having a free end adapted to extend outwardly of said stationary subassembly and a captive end, said coolant directing assembly having coolant distributing passage means extending from an inlet in the captive end of said shank and an outlet at the free end of said shank for directing coolant endwardly and inwardly of said shank.

9. A coolant handling device as in claim 8 wherein ther is jig member having an inner face adjacent the coolant directing assembly and an outer face, the stationary subassembly having one of the releasable interlocking members thereon at a location adjacent the inner face, said shank extending from a location adjacent said interlocking member to a location adjacent said outer face of the jig member.

10. A coolant handling device as in claim 9 wherein the releasable interlocking member of the stationary subassembly is at a location between said inner and outer faces.

11. A coolant handling device as in claim 8 wherein said stationary subassembly means for mounting said subassembly in a jig member which has a inner face for positioning adjacent said coolant directing assembly, on outer face, and a predetermined thickness, said stationary subassembly comprising an axially disposed exteriorly threaded portion adapted when mounted in the jig member to extend exteriorly of said outer face and an interiorly threaded nut adapted to engage said exteriorly threaded portion in a position for operating engagement with said outer face.

12. A coolant handling device as in claim 8 wherein said stationary subassembly comprises means for mounting said subassembly in a moldable type jig member which has an inner face for positioning adjacent said coolant assembly and an outer face, said stationary subassembly comprising an exterior cylindrical wall adapted to extend between the interior and exterior faces of said jig member, said cylindrical wall having configuration surface means adapted for engagement with portions of said moldable type jig member.

13. A coolant handling device as in claim 12 wherein said configuration surface means comprises an annular recess.

* * * * *